United States Patent [19]

Tanaka

[11] Patent Number: 5,441,232
[45] Date of Patent: Aug. 15, 1995

[54] SOLENOID VALVE

[75] Inventor: Masaharu Tanaka, Sashima, Japan

[73] Assignee: Kyosan Denki Co., Ltd., Tokyo, Japan

[21] Appl. No.: 166,348

[22] Filed: Dec. 10, 1993

[51] Int. Cl.$^6$ .............................................. F16K 31/06
[52] U.S. Cl. ........................ 251/129.05; 251/129.08; 251/129.1
[58] Field of Search ................ 251/129.05, 129.08, 251/129.1, 129.18

[56] References Cited

U.S. PATENT DOCUMENTS

| | | | |
|---|---|---|---|
| 4,483,369 | 11/1984 | Akagi et al. | 251/129.08 |
| 4,512,546 | 4/1985 | Inada et al. | 251/129.08 |
| 4,546,795 | 10/1985 | Okamoto et al. | 251/129.05 |
| 4,972,996 | 11/1990 | Cerny | 251/129.1 |
| 4,988,074 | 1/1991 | Najmolhoda | 251/129.08 |
| 5,178,359 | 1/1993 | Stobbs et al. | 251/129.1 X |

*Primary Examiner*—John Rivell
*Attorney, Agent, or Firm*—Flynn, Thiel, Boutell & Tanis

[57] ABSTRACT

A solenoid valve capable of controlling precisely a small quantity of flow and obtaining a large quantity of fluid. In a duty control solenoid valve, there are provided a guide body for shutting off a fluid passage and in which a plunger is slidably guided, plural stages of flow control ports which are provided in the guide body and are opened or closed in response to the movement of the plunger, a plurality of return springs in response to the plural stages of flow control ports whereby the excitation energy of the electromagnetic coil can be switched to plural stages or the electromagnetic coils are selectable separately, thereby varying the opening areas of the plural stages of flow control ports.

5 Claims, 3 Drawing Sheets

SOLENOID VALVE

BACKGROUND OF THE INVENTION

1. Field of the Invention:

The present invention relates to an improvement of a duty control solenoid valve, more particularly, to a solenoid valve capable of obtaining excellent flow control characteristic in all ranges of flow, i.e. from the small quantity of flow to large quantity of flow.

2. Prior Art:

A flow control solenoid valve having a plunger operable by an electromagnetic coil and a valve port which is opened or closed by the plunger wherein the opening time of the valve port is controlled to control the quantity of flow, a so-called duty control solenoid, has been used in various fields. The solenoid valve is hereinafter described with reference to a known solenoid valve which is provided in a purge line in an evaporative emission control system of a fuel tank of an automobile but the solenoid valve of the invention can be applied to a general purpose flow control solenoid valve.

The prior art solenoid valve is structured as illustrated in FIG. 4.

There is provided a plunger 3 which is operated toward a stator 2 by an electromagnetic attraction of an electromagnetic coil 1. A valve element 4 is provided on the plunger 3. There is provided a return spring 6 for urging the plunger 3 toward a valve port 5. The electromagnetic attraction of the electromagnetic coil 1 and the resiliency of the return spring 6 apply alternately to the plunger 3 whereby the valve port 5 is opened or closed by the valve element 4 in a given cycle. A flow control nozzle 8 is provided in a fluid passage 7 through which fluid flows.

According to the prior art solenoid valve, the maximum quantity of flow is determined by an opening area of the flow control nozzle 8 supposing that the pressure is constant. This is explained with reference to FIG. 5 showing the flow control characteristic. In the maximum quantity of flow Q1, the duty ratio is 100% where the valve element 4 always opens the valve port 5. The maximum quantity of flow is determined by the opening area of the flow control nozzle 8. Theoretically, the quantity of flow Q1 is proportional to the duty ratio and the flow control characteristic line is linear in FIG. 5.

There is the following problems in the prior art solenoid valve.

If the solenoid valve is used in the purge line of the evaporative emission control system, it is used in the range from the small quantity to large quantity of flow and a precise flow control is required in the small quantity of flow. However, in the prior art solenoid valve provided with the flow control nozzle having a constant opening area, it is difficult to precisely control the small quantity of flow.

This is described more in detail. If the flow control is performed in the range from the small quantity to large quantity of flow, the opening area of the flow control nozzle 8 is so large that the solenoid valve obtains a large quantity of fluid, namely, a large quantity of fluid is introduced in the solenoid valve through the flow control nozzle 8. However, such a flow control nozzle having the large opening area is inferior in its flow control characteristic in the small quantity of flow so that it can not perform the precise flow control in case of small quantity of flow.

On the other hand, if the precise flow control is performed in the small quantity of flow, the opening area of the nozzle 8 must be small, which however can not obtain a large quantity of fluid.

Accordingly, the prior art solenoid valve has been used by permitting the opening area of the flow control nozzle 8 to be large while sacrificing the flow control characteristic in the small quantity of flow.

SUMMARY OF THE INVENTION

It is therefore an object of the invention to improve the aforementioned problems and to provide a solenoid valve provided with plural stages of flow control nozzles having plural stages of opening areas which are selectable whereby a precise flow control in the small quantity of flow can be performed while obtaining a large quantity of fluid.

To achieve the above objects, the solenoid valve of the first aspect of the invention comprises an electromagnetic coil 12, a plunger 14 which is operated toward one side thereof by an electromagnetic attraction of the electromagnetic coil 12, a valve element 18 provided on the plunger 14, first and second return springs 16 and 17 for urging the plunger 14 toward the other side thereof, fluid passages 19 and 20 through which fluid flows and a valve port 15 provided in the fluid passages 19 and 20, the valve port 15 being open or closed by the valve element 18 wherein opening time of the valve port 15 is controlled by exciting the electromagnetic coil 12 in a given cycle which can be regulated, characterized in that the solenoid valve further comprises a guide body 21 for shutting off the communication between the fluid passages 19 and 20, in which guide body 21 the plunger 14 is slidably guided, flow control ports 22A and 22B in the guide body which are disposed vertically to define plural stages of operations the flow control ports 22A and 22B are opened or closed in response to the movement of the plunger 14, wherein the plurality of return springs are activated in response to the plural stages of operation of the flow control ports and the excitation energy of the electromagnetic coil 12 can be switched to define plural stages so that the plunger 14 can open or close the flow control ports separately and vary the opening areas of the flow control ports.

The solenoid valve according to the second aspect of the invention comprises an electromagnetic coil 12, a plunger 14 which is operated toward one side thereof by an electromagnetic attraction of the electromagnetic coil 12, a valve element 18 provided in the plunger 14, first and second return springs 16 and 17 for urging the plunger 14 toward the other side thereof, fluid passages 19 and 20 through which fluid flows and a valve port 15 provided in the fluid passages 19 and 20, the valve port 15 being open or closed by the valve element 18 wherein opening time of the valve port 15 is controlled by exciting the electromagnetic coil 12 in a given cycle which can be regulated, characterized in that the solenoid valve further comprises a guide body 21 for shutting off the communication between the fluid passages 19 and 20, in which guide body 21 the plunger 14 is slidably guided, flow control ports 22A and 22B in the guide body which are disposed vertically to define plural stages, the flow control ports 22A and 22B are opened or closed in response to the movement of the plunger 14, wherein the plurality of return springs are activated in response to the plural stages of operation of the flow control ports and a plurality of electromagnetic coils 12 are provided so that the plunger 14 can open or close the flow control ports separately, and the opening areas of the plural stages of the flow control ports 22A and 22B can be varied by selectively exciting the electromagnetic coil 12.

With such an arrangement of the invention, the strong or weak excitation energy of the electromagnetic coil which is caused by the application of a high or low current (voltage) thereto is selected or one of the electromagnetic coil is selected among the plurality of electromagnetic coils having different electromagnetic attraction whereby the opening areas of the flow control ports are small in case of weak electromagnetic force to thereby improve the flow control characteristic in the small quantity of flow and opening areas of the flow control ports are large in case of strong electromagnetic force to thereby obtain a large quantity of fluid.

DESCRIPTION OF THE PREFERRED EMBODIMENT

Figure 1:
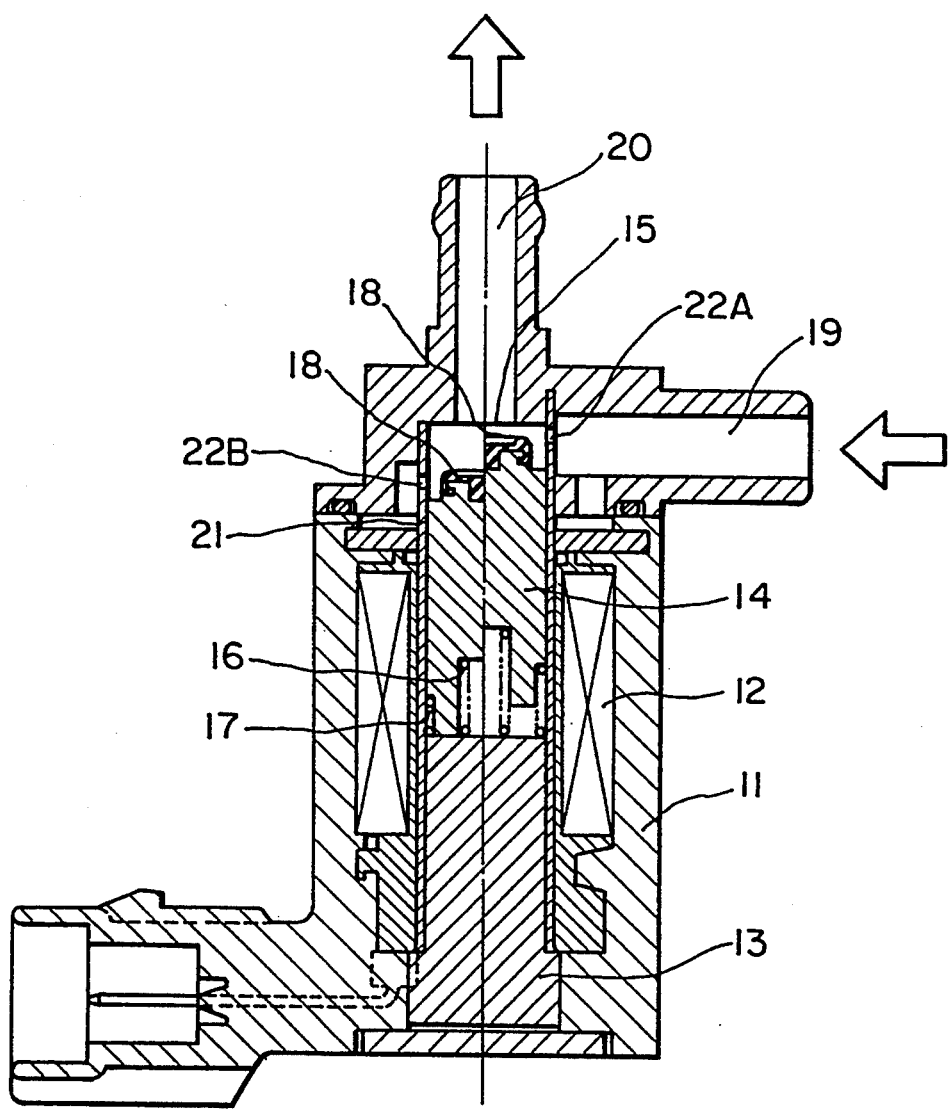
FIG. 1 is a cross-sectional view of a solenoid valve according to a preferred embodiment of the invention.

A preferred embodiment of the invention will be described with reference to FIG. 1.

There are provided an electromagnetic coil 12 which is disposed inside a valve body 11 and a plunger 14 which is disposed inside the electromagnetic coil 12 and urged toward a stator 13 by an electromagnetic attraction of the electromagnetic coil 12. First and second return springs 16 and 17 are provided between the plunger 14 and the stator 13 for urging the plunger 14 toward the valve port 15. A valve element 18 is provided at the upper end surface of the plunger 14 for opening and closing the valve port 15 when the plunger 14 moves reciprocally upwardly by the spring. There are provided fluid inlet and outlet passages 19 and 20 in the valve body 11. The valve port 15 is provided between the fluid inlet and outlet passages 19 and 20. The electromagnetic coil 12 is excited by a given current (voltage) and cycle which is controllable by a current (voltage) controller, not shown, whereby the total opening time of the valve port 15 is controlled, i.e. under a so-called duty control. That is, the quantity of fluid flow is controlled by the difference of the long opening time and short opening time of the valve port 15 which is the so-called duty control.

There is provided a guide body 21 or sleeve for shutting off the communication between the fluid inlet and outlet passages 19 and 20, and the plunger 14 is slidably guided inside the body 21. There are two stages of flow control created by axially spaced ports 22A and 22B which are formed in sleeve 21 and are closed in response to the movement of the plunger 14.

The solenoid valve having such an arrangement will be operated in the following manner.

The plunger 14 is urged upward by resiliency of the first return spring 16 when the electromagnetic coil 12 is not excited so that the valve element 18 closes the valve port 15. If the electromagnetic coil 12 is excited by a low current, the plunger 14 moves downward while compressing the first return spring 16 and contacts the second return spring 17 at the position where it opens only the first control port 22A and stops there (refer to right half of the plunger of FIG. 1). At this state, the fluid flows through the flow control port 22A alone. If the excitation of the electromagnetic coil 12 is released, the plunger 14 is returned in the direction to close the valve port 15 by the resiliency of the first return spring 16. With repetition of these operations, the opening time of the valve port 15 is controlled in the manner that the quantity of flow is large if the closing time of the valve port 15 is long while the quantity of flow is small if the opening time of the valve port 15 is short. This is the so-called duty control.

The opening area of the flow control port 22A is relatively small so that it does not exert a bad influence upon the flow control characteristic even if the quantity of flow is small.

In the case where the quantity of flow is large, the electromagnetic coil 12 is excited by a high current and the plunger 14 moves downward while compressing both the first and second return springs 16 and 17 by the excitation energy and stops at the position where it opens both flow control port 22A and 22B (refer to the left half of the plunger in FIG. 1). At this state, the fluid flows through the first and second control port 22A and 22B, thereby obtaining a large quantity of fluid.

The solenoid valve is not limited to the preferred embodiment as set forth above. For example, the solenoid valve may be provided with at least three return springs and at least three flow control ports wherein the current (voltage) may be switched to at least three stages.

The current (voltage) to be applied to the electromagnetic coil is varied according to the preferred embodiment. The solenoid valve may be structured as follows.

Figure 2:
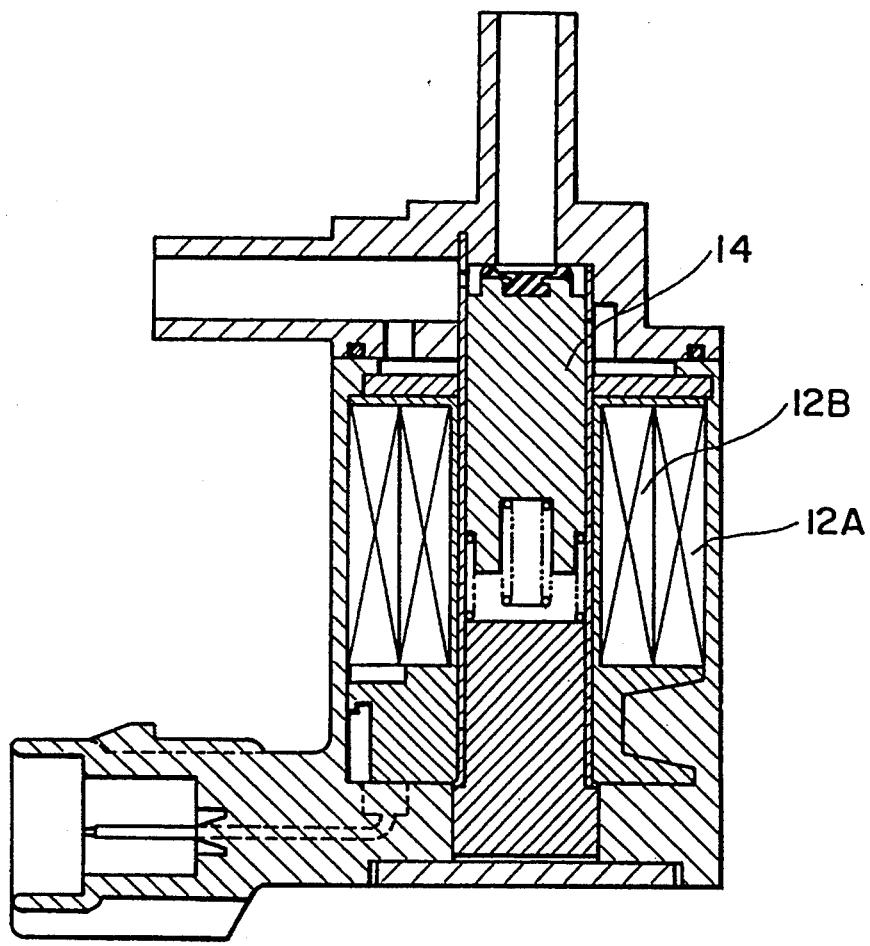
FIG. 2 is a cross-sectional view of a solenoid valve according to another embodiment of the invention.

In FIG. 2, the modification of the electromagnetic coil is a double coil comprising a first electromagnetic coil 12A and a second electromagnetic coil 12B. The electromagnetic coil is excited weak by the first electromagnetic coil 12A while it is excited strong by the second electromagnetic coil 12B, whereby the plunger 14 can be regulated to move in two stages. It is a matter of course that the electromagnetic coil may comprise at least triple coils and the number of the flow control ports and the return springs may be at least three whereby the flow control characteristic may be plural.

Figure 3:
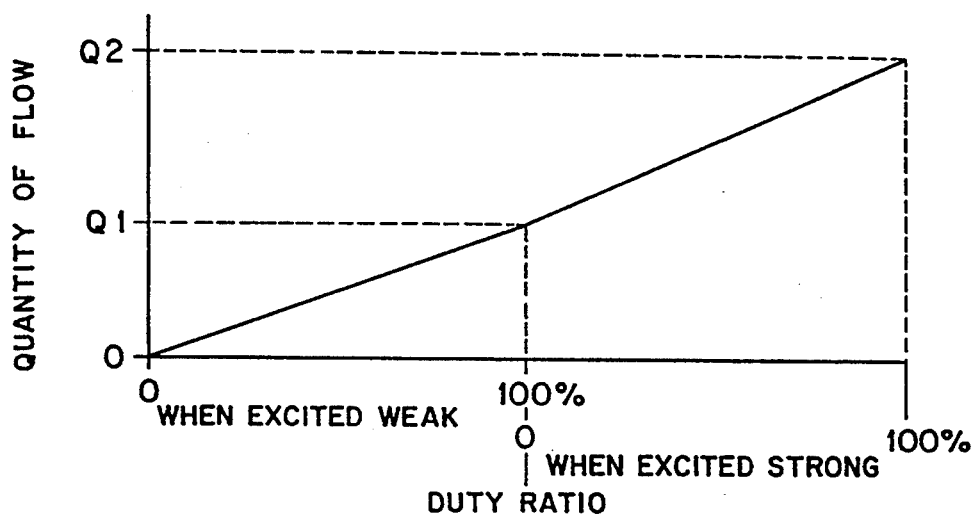
FIG. 3 is a graph showing a flow control characteristic according to the solenoid valve of the invention.
Figure 4:
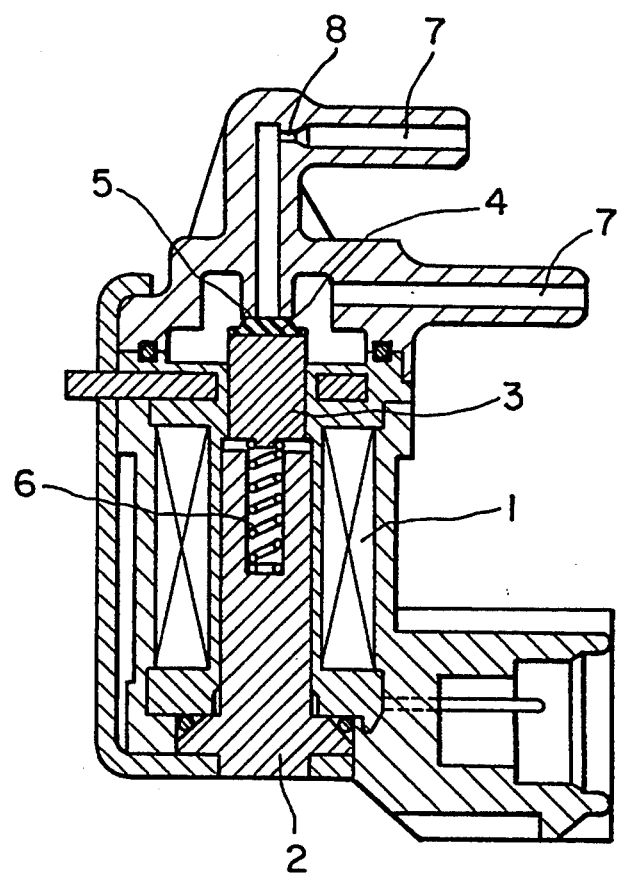
FIG. 4 is a cross-sectional view of a prior art solenoid valve.
Figure 5:
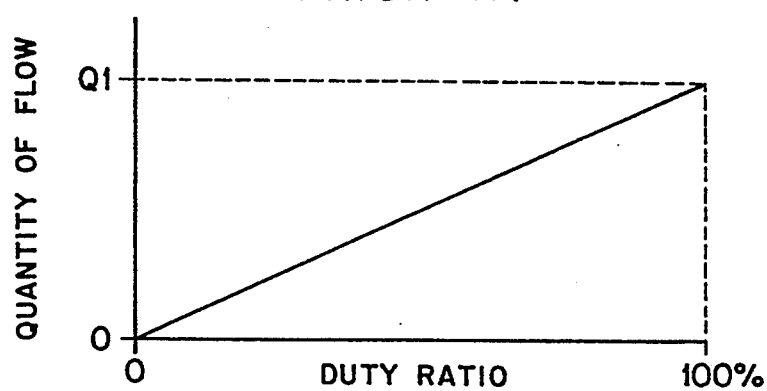
FIG. 5 is a graph showing a flow control characteristic according to the prior art solenoid valve.

The flow control characteristic of the solenoid valve according to the invention will be described with reference to FIG. 3. The flow control characteristic by the first stage of flow control port 22A shows a maximum quantity of flow Q1 which represents the improvement of the flow control characteristic in small quantity of flow while the flow control characteristic by the sum of the first and second flow control ports 22A and 22B shows a maximum quantity Q2 which represents the obtaining of the large quantity of fluid.

The solenoid valve having such an arrangement and function has the following effects.

It is possible to precisely control a small quantity of flow and also obtain large quantity of fluid.

The solenoid valve of the invention is simplified in the structure without being made large and is very useful since the present invention is a combination of the prior art solenoid valve and a guide body and a current (voltage) regulator.

What is claimed is:

1. In a duty control solenoid valve having an electromagnetic coil, a plunger which is movably operated in one direction by electromagnetic attraction upon energization of the electromagnetic coil, a valve element provided on the plunger, return spring means for movably urging said plunger in an opposite direction, fluid passages through which fluid flows and a valve port provided in said fluid passages, said valve port being open or closed by said valve element wherein opening time of said valve port is controlled by exciting said electromagnetic coil in a given cycle which can be regulated, the improvement comprising:

a guide body, said plunger being longitudinally slidably guided in said guide body;

at least first and second flow control ports formed in said guide body in longitudinally spaced relation to provide at least first and second stages of flow control between said fluid passages, said flow control ports being opened or closed in response to the movement of the plunger; and said return spring means including at least first and second return springs which movably urge the plunger in said opposite direction and provide different urging for said first and second stages, whereby the excitation energy of said electromagnetic coil can be switched to first and second stages so that said plunger can open or close said flow control ports in stages to vary the opening areas of said flow control ports.

2. A solenoid according to claim 1, including at least first and second said electromagnetic coils which are selectively energizable for controlling movement of said plunger and for selectively positioning the plunger to define said first and second stages of flow control.

3. A solenoid according to claim 1, wherein said return spring means normally urge said plunger in said opposite direction so that said valve element normally closes said valve port, said guide body comprising a hollow tubular element in which said plunger is slidably supported, said control ports being formed in a side wall of said hollow element so as to be opened or closed in response to slidable movement of the plunger within the hollow element, only said first control port being open when said plunger is in a first open position, both of said first and second control ports being in an open position when said plunger is in a second open position which is spaced longitudinally a greater distance from said valve port then said first open position.

4. A solenoid according to claim 3, wherein said first return spring urges said plunger toward the closed position when said plunger is in said first and second open positions, and wherein said second return spring exerts no significant urging force on said plunger when in said first open position but exerts an urging force on said plunger when in said second open position.

5. A solenoid according to claim 3, including at least first and second said electromagnetic coils which are selectively energizable for controlling movement of said plunger and for selectively positioning the plunger to define said first and second stages of flow control.

* * * * *